United States Patent Office 2,765,286
Patented Oct. 2, 1956

2,765,286

MANUFACTURE OF POLYMER-RESIN GRANULES

Albert I. Goldberg, Roslyn Heights, and Robert F. Doering, Malverne, N. Y., assignors to National Starch Products Inc., New York, N. Y., a corporation of Delaware No Drawing. Application January 5, 1952,
Serial No. 265,204

12 Claims. (Cl. 260—27)

This invention relates to the manufacture or production of high molecular weight polymer granules containing a low molecular weight resin uniformly dispersed therein within the granule structure.

The prime object of the present invention is the production of high molecular weight polymer granules, which may be in the form of beads or pearls, in which a low molecular weight resin is incorporated or introduced into the granule (or bead) form of the polymer and is uniformly distributed therein.

By "high molecular weight polymers" as referred to hereinafter and in the appended claims we refer to water-insoluble polymers having a degree of polymerization of at least 100 or a molecular weight of approximately 10,000 or higher. Examples of such polymers are polyvinyl acetate, polyvinyl chloride, polyvinyl butyrate, polyvinyl formate, polymethyl methacrylate, and polystyrene, as well as copolymers of these or other high molecular weight polymers; and high polymeric materials of the type of ethyl cellulose, cellulose acetate, nitrocellulose and polyvinylacetals.

By "resins" as referred to hereinafter and in the appended claims we refer to those materials which are characterized by being water-insoluble, normally solid or semi-solid, complex amorphous mixtures of organic compounds with no definite melting point and no substantial tendency to crystallize. One characteristic of resins is that they form thin, non-viscous liquids upon heating, whereas high polymers are not ordinarily decreased in viscosity to thin liquid form by heating. Resins, as the term is here comprehended, are further characterized by very much lower molecular weight than high polymers. Resins may be synthetic or of natural origin. Representative of the resins which are of particular interest for the purpose of our invention and which are characterized by the aforesaid low molecular weights, are rosin and its derivatives, i. e., hydrogenated, polymerized, disproportionated or esterified rosins; cumar, damar, copal, and the polyterpenes; alkyd resins; resinous chlorinated diphenyls; rosin-modified phenolic resins (as, for example, Amberol F7 and F77, sold by Rohm & Haas Company, Philadelphia, Pa., the former having a softening point, according to the capillary tube method, of 118–125° C., a melting point, ring and ball method, of 142–149° C., an acid number of 11–20 and specific gravity of 1.10, and the latter having a softening point of 128–135° C., a melting point of 150–160° C., an acid number under 20 and a specific gravity of 1.11); maleic rosin adduct ester (as, for example, Amberol 800, sold by Rohm & Haas Company, Philadelphia, Pa., this product having a softening point, capillary tube method, of 95–100° C., a melting point, ring and ball method, of 122–126° C., an acid number of 15–30 and a specific gravity of 1.13); phenolic resins (as, for example, BR 17620, sold by Carbide and Carbon Chemicals Corp., New York, N. Y., or Durez 12687, sold by Durez Plastics and Chemicals Inc., North Tonawanda, N. Y., the former being a solid lump resin having a softening point of 180–220° F. and a specific gravity of 1.23–1.25, and the latter being a finely powdered material having a softening point of 40–60° C. and a melting point of 70–75° C.). Additional examples of resins are the following: gasoline-insoluble resin derived from the dark colored residue concurrently removed with F. F. wood rosin after extraction of pine chips with a coal tar hydrocarbon (as sold by the Hercules Powder Company under the trade name Vinsol); run Congo; run Macassar; run Kauri; Elemi gum; Manila; gum Pontianac; East India gum. Whenever we refer to "low molecular weight resins" or, for the sake of brevity, merely to "resins," it will be understood that we refer to natural or synthetic resins characterized by a molecular weight of much lower than 10,000 as contrasted to polymers having a molecular weight of 10,000 or more.

Polymerization methods may be said to fall into four broad classes. One, known as bulk polymerization, comprises merely heating a monomer in the presence of a catalyst, and in the substantial absence of any additives, until the polymer is formed (usually as a solid or semisolid mass). By another method, referred to as solution polymerization, the monomer is dissolved in an organic solvent, and polymerization takes place upon heating in the presence of catalyst. This method usually entails the need for subsequent removal and recovery of the solvent, unless the polymer is soluble in the solvent and it is desired to obtain the polymer in solution form. The third method, known as emulsion polymerization, and the fourth, known as bead polymerization, involve suspending or emulsifying the monomer in water, in the presence of an emulsifying or suspending agent; upon heating in the presence of catalyst the polymer is formed either as an emulsion, or in the form of larger, filterable particles or granules which are known as pearls or beads (the particular form depending upon the reaction conditions).

It is frequently preferred to obtain the polymers in the form of beads because of the obvious convenience of storing, transporting and handling the dry, smooth flowing granules. However, many industrial applications require that the polymer be combined with other materials, such as low molecular weight resins, plasticizers and the like. The incorporation of resins into polymer beads has heretofore presented a serious production problem, for several reasons.

If one adds a low molecular weight resin additive to the monomer in the aqueous dispersion, prior to polymerization, with the object of having the resin incorporated within the polymer simultaneously with the formation of the polymer beads, it is found that the addition of any substantial amount of resin (i. e., approximately 5% or more) acts to seriously retard or entirely inhibit the subsequent polymerization. In general, it can be said that the addition of almost any extraneous material in this manner tends, at the very least, to reduce the molecular weight that can be achieved in the polymer.

One might also heat the finished polymer beads or a bulk polymer together with a resin such, for example, as cumar, and allow the viscous mass to cool to a solid, which could then be broken up and ground. Or one might dissolve the polymer beads and resin in a common solvent, thereafter evaporating the solvent and grinding the solid residual mass. It is seen, however, that in both these cases one would be confronted by the expensive and time-consuming operations of handling the viscous liquid and grinding the resulting solid. Another disadvantage of grinding is the production of a large amount of "fines," i. e., a proportion of the product being ground too finely and acting to cement the remainder of the ground material into undesirable agglomerates.

We have now discovered that additives of the nature of low molecular weight resins may be uniformly incorporated with or dispersed in high molecular weight polymers in bead, pearl or other granule form, without going through the disadvantageous steps of heat fusion or common solution followed by grinding. We accomplish this objective by adding the resin to a suspension, preferably an aqueous suspension of the high polymer granules, in which suspension there is present a small proportion of an organic solvent, which is a solvent for the polymer as well as for the resin, and which solvent is substantially insoluble in the suspending medium or agent. The solvent should be present in an amount sufficient to soften and swell the polymeric granules or beads, but not in so large an amount as to cause actual fusion of the granules or beads with one another, the polymer beads being maintained in granule and suspended form. The exact amount of solvent to be used will necessarily vary with different solvent-polymer-resin systems. The resin may be added either in solid form (preferably ground) or as a melted liquid, or as a solution.

The resin addition may be made to polymer beads or granules which have been formed from monomers or to beads which have been made from already existing polymers. Preferably, the resin addition is made to beads obtained in a polymerization process and most preferably as a step in the bead polymerization process. For the latter, the monomer is dispersed in water in the presence of a polymerization catalyst and suspending agent, and bead or pearl polymerization is permitted to proceed in the usual manner until the desired extent of polymerization has been achieved. Then the resin is added to the suspension of polymer beads. If polymerization has not been permitted to go to completion, there may be sufficient monomer present in the suspension to act as the necessary mutual solvent for beads and resin (assuming, of course, that the monomer is a solvent for the particular polymer-resin system in question). If the monomer is a solvent for both the polymer and the resin, but not enough remains in the suspension because of fairly complete polymerization, then additional monomer may be added. Other solvents may also be employed, such, for example, as ethyl acetate, chloroform, or toluene; always remembering that the material chosen must be a solvent for both the polymer beads and the resin. Some chemicals, which are added to polymers as plasticizers, also have the property of being mutual solvents for particular polymer-resin systems. In such cases the addition of such a plasticizing chemical, as well as a resin, to the aqueous suspension of polymer beads serves the double purpose of incorporating both a resin and a plasticizer into the polymer beads.

The hitherto unpredicted fact has been discovered, that under the above-described conditions the low molecular weight resin, rather than forming a separate suspension, is uniformly incorporated with the polymer beads, which may be filtered and dried in the usual manner, resulting in a dry, high molecular weight polymer in granule or bead form, containing uniformly incorporated therewith the required proportion of low molecular weight resin (as well as other additives, such as plasticizers, if desired).

It should be emphasized that the high polymer beads made by our process are not merely coated with the resin but, rather, have the resin uniformly distributed throughout the entire mass of each polymer bead.

By our process, it is possible to incorporate low molecular weight resin into high polymer beads in any desired proportion. Thus, we have incorporated resin in the proportion of 5% resin and 95% polymer, and on the other hand have produced beads containing as much as 90% resin, or more, and only 10% or less of the polymer. It is to be noted that the addition of even large percentages of resin is accomplished without any reduction of the molecular weight of the polymer, since the resin is always added after the desired molecular weight polymer has already been attained. This is to be contrasted with the fact previously pointed out that the addition to the monomer, prior to polymerization, of amounts of resin above 5% (based on the resulting polymer), results in serious inhibition of the polymerization and a drastic reduction in the molecular weight obtainable in such polymer as may be formed.

It is further to be noted that the invention is not limited to any particular molecular weight in the polymer except that, as previously stated, the polymer should always have a molecular weight of 10,000 or more, since the resin may be added to whatever molecular weight polymer is desired for a particular application. Thus, by our process, we can prepare polymer-resin beads wherein the polymer may vary over a wide range of molecular weights.

The following examples will further illustrate the embodiment and the principles of our invention:

*Example I*

This example illustrates the bead polymerization of vinyl acetate, with the incorporation within the beads of 29% of a mixture of gum rosin and pentaerythritol ester of rosin (based on the weight of the polymer). In this, as in the subsequent examples, all parts given are by weight.

A one liter, round bottom, three neck flask was equipped with an 18 inch condenser, thermometer, and stainless steel stirrer. The flask was immersed in a glycerine bath and heated by means of a hot plate.

Into the flask there were poured 1.18 parts of an aqueous solution of polyvinyl alcohol as suspending agent, containing 17% solids, followed by the addition of 100 parts water. The mixture was agitated until completely homogeneous. One part benzoyl peroxide as catalyst was then dissolved in 100 parts of freshly distilled vinyl acetate, and the solution was added, with constant agitation, to the polyvinyl alcohol solution in the reaction flask.

The reaction mixture was then heated to reflux temperature. Initial reflux began at 65° C. and reached equilibrium at 66° C., at which temperature it remained for about 1½ hours. At the end of that period the temperature gradually began to rise, and by 2 hours from the beginning of reflux it had reached 67° C., reaching 69.5° C. in another 40 minutes. At this latter temperature there were added 16.7 parts of a powdered mixture of equal parts of gum rosin and pentaerythritol ester of rosin, which inhibited further polymerization. The reflux temperature immediately rose to 71° C., and remained at that point during the following hour in which agitation of the mixture of water, polymer, unreacted monomer, rosin and pentaerythritol ester of rosin was continued.

At about 1 hour and 25 minutes after the initial reflux, small particles (pearls) of polymer could be seen at the walls of the reaction vessel. The presence of the pearls was easily noticeable throughout the remaining course of the reaction.

Unreacted monomer which remained at the end of the reaction was distilled off, the temperature rising from 71° C. to 100° C. It was calculated, from the quantity of unreacted monomer which was recovered, that the polymerization had gone to 58% completion.

The reaction mixture was then cooled, with agitation, until the temperature had dropped to approximately 30° C. Thereupon, agitation was stopped and the formulated pearls were poured into a vessel containing cold water. The pearl-water mixture was stirred thoroughly and then allowed to settle. The clear liquid was poured off and the pearls collected on a Buchner type funnel, washed twice with cold water and dried. Passage of a current of warm air over the pearls facilitated drying, and the pearls were stirred occasionally to minimize any possible tendency toward lump formation.

Whereas pearls consisting solely of polyvinyl acetate, or of rosin, respectively, would be glass-clear and transparent, the pearls of the present example were opaque, indicating an actual molecular dispersion of polymer and rosin. The rosin and polymer are clear (compatible) when hot, but become opaque on cooling to room temperature.

*Example II*

This example is similar to Example I, except that in this present case polymerization was permitted to go to 98% of completion before the rosin mixture was added. This example illustrates the advisability, where the monomer has been substantially completely consumed, of adding additional monomer (or other polymer-resin solvent) together with the resin additive.

Following the general procedure of Example I, which was typical of bead polymerization runs, 100 parts of vinyl acetate in 100 parts water, with 1.18 parts of a 17% aqueous solution of polyvinyl alcohol as suspending agent and 1 part benzoyl peroxide as catalyst, were refluxed until the temperature rose to 90° C., at which point the polymerization was found to be 98% complete. To the suspension of pearls there were added 16.7 parts of a powdered mixture of equal parts of gum rosin and pentaerythritol ester of rosin, dissolved in twice its weight of vinyl acetate monomer. Treatment following the addition of rosin was continued as in Example I. The dried pearls were opaque yellow, free-flowing and generally comparable to those of Example I. Seventeen percent resin had been incorporated into the polymer.

*Example III*

This example illustrates the necessity for the presence of a mutual solvent for the polymer and resin. The procedure of Example II was repeated, using the same quantities of vinyl acetate monomer, suspending agent and catalyst. When polymerization had reached 95% completion (there being therefore no substantial quantity of monomer left), 25 parts of the powdered mixture of rosin and pentaerythritol ester of rosin were added, with no concomitant addition of monomer to act as mutual solvent. The remaining steps were carried out as in Example I. It was found that the appearance of the beads was very poor, and heterogeneous. In other words, there were beads of rosin and beads of polymer, as well as other beads in various stages of admixture, as contrasted to the uniform merger of polymer and resin in all the beads of Examples I and II.

*Example IV*

This example illustrates the bead polymerization of styrene, with the incorporation within the beads of 28% of gum rosin on the polystyrene.

Following the bead polymerization procedure of Example I, 100 parts styrene in 500 parts water, containing 1 part benzoyl peroxide as catalyst and 0.5 part polyvinyl alcohol as suspending agent, were polymerized under reflux conditions until polymerization was calculated to be 90% complete. Twenty-five parts of gum rosin, dissolved in 3.3 times its weight of styrene monomer were then added, the remaining procedure being similar to that of Example I. Opaque yellow beads of excellent, homogeneous appearance were formed.

*Example V*

This example illustrates the formation of beads of a copolymer of methyl acrylate and vinylidene chloride, containing incorporated therein 25% of rosin.

Seventy-five parts of methyl acrylate and 25 parts of vinylidene chloride, in 500 parts water containing 0.5 part benzoyl peroxide as catalyst and 4.0 parts magnesium carbonate as suspending agent, were subjected to polymerization conditions, following the typical procedure of Example I. When polymerization was calculated to be practically 100% complete, there were added 25 parts of gum rosin dissolved in 50 parts ethyl ecetate. The remaining steps were carried out in accordance with the procedure outlined in Example I. The resulting pearls were discrete, unagglomerated, and characterized by excellent uniformity of rosin distribution.

*Example VI*

This example illustrates the formation of polyvinyl acetate pearls having incorporated therein 285% of gum rosin.

One hundred parts of vinyl acetate, in 100 parts water containing 1 part benzoyl peroxide and 0.2 part polyvinyl alcohol, were subjected to polymerization conditions, following the typical procedure indicated in Example I. Polymerization was stopped at the final reflux temperature of 70° C., and it was estimated that polymerization was about 70% complete. Two hundred parts powdered gum rosin were then added, together with 100 parts water and 0.2 part polyvinyl alcohol. The reason for the added water and the polyvinyl alcohol suspending agent was merely to accommodate the great amount of rosin solids added to the system. Treatment of the pearl-rosin suspension was continued in accordance with the procedure of Example I. The resulting pearls were comparable in uniformity to those of Example I.

*Example VII*

This example illustrates the bead polymerization of vinyl acetate, with the incorporation within the beads of 800% of an ester gum (based on the weight of the polymer).

One hundred parts of vinyl acetate, in 100 parts water containing 1 part benzoyl peroxide and 0.2 part polyvinyl alcohol, were subjected to polymerization conditions, following the typical procedure set forth in Example I. Polymerization was stopped at the final reflux temperature of 68° C., and it was estimated that polymerization was about 45% complete. There were then added 360 parts of glycerol ester of hydrogenated rosin, 90 parts of ethyl acetate, 360 parts water and 0.2 part polyvinyl alcohol. The solvent, water and suspending agent were added in order to accommodate the extremely large proportion of added resin. Treatment of the pearl-resin suspension was continued in accordance with the general procedure of Example I. The resulting pearls were comparable to those of Example I in uniformity.

*Example VIII*

This example illustrates the bead polymerization of invyl acetate, with the incorporation within the beads of 21% of cumar resin as well as 42% of a plasticizer, dicyclohexyl phthalate (percentages being based on the weight of the polymer).

One hundred parts of vinyl acetate, together with 100 parts of water, 1.5 parts benzoyl peroxide, 0.2 part polyvinyl alcohol and 40 parts dicyclohexyl phthalate, were subjected to polymerization conditions, following the typical procedure of Example I. When polymerization was stopped at the final reflux temperature of 94° C., it was estimated that polymerization was about 95% complete. Twenty parts of cumar resin were then added, and treatment of the plasticized pearl-resin suspension was continued, following the general procedure set forth in Example I. The resulting polymer pearls were characterized by having uniformly distributed therein not only a resin but also a plasticizer.

*Example IX*

This example illustrates the introduction of resins into particles or granules of polyvinyl butyral.

One hundred parts of polyvinyl butyral, in powdered form, were suspended in 350 parts of water, containing 0.4 part polyvinyl alcohol. There were then added 30 parts of alpha pinene resin (of the grade sold by Newport Industries Inc., New York, under the trade name "Newport S"), and 45 parts of ethyl acetate. With continuous agitation, the mixture was heated at reflux temperature for approximately two hours. At the end of this period, the solvent was distilled off in the usual manner. After cooling, the mixture was poured into cold water and the polyvinyl butyral particles, now containing the added resin, were collected and dried in the usual manner.

*Example X*

This example illustrates the incorporation of gum damar resin into particles or granules of ethyl cellulose.

One hundred parts of powdered ethyl cellulose were suspended in 600 parts of water, containing 1.2 parts of polyvinyl alcohol. Forty parts of gum damar and 40 parts of benzene were added, and the mixture heated, with agitation, at reflux temperature for about two hours. At the end of this period, the solvent was distilled off in the usual manner. After cooling, the mixture was poured into cold water, and the ethyl cellulose particles, now containing the damar resin, were collected and dried in the usual manner.

*Example XI*

This example illustrates the incorporation of gum rosin into beads of polyvinyl acetate.

One hundred parts of polyvinyl acetate beads (of the type sold by E. I. du Pont de Nemours under the trade name "Elvacet 41–95") were suspended in 400 parts of water containing 0.8 part of polyvinyl alcohol. There were then added 40 parts of gum rosin and 80 parts of chloroform. (It should be pointed out that in this, as in the previous examples, the resin and solvent may be added as two separate components, or as a solution of the resin in the solvent.) With continuous agitation, the mixture was heated at reflux temperature for about three hours. At the end of this period, the solvent was distilled off in the usual manner. After cooling, the mixture was poured into cold water and the polyvinyl acetate beads, now containing the gum rosin, were collected and dried.

*Example XII*

This example illustrates the incorporation of gum rosin into beads of nitrocellulose.

One hundred parts of a solution of nitrocellulose (¼ second viscosity) in ethyl acetate, containing 28.8 parts nitrocellulose solids, were mixed with 200 parts water containing 0.4 part polyvinyl alcohol dissolved therein. The temperature of the water was 71° C. Beads of nitrocellulose were formed almost at once. Thirty parts of gum rosin were added, and the suspension were refluxed at 74° C. for approximately one hour, with continuous agitation. At the end of this period, the solvent was distilled off in the usual manner. After cooling, the mixture was poured into cold water, and the nitrocellulose beads, now containing the gum rosin homogeneously dispersed, were collected and dried.

*Example XIII*

This example illustrates the incorporation of 14% of an alkyd resin together with 8% of nitrocellulose, into polyvinyl acetate beads.

Following the bead polymerization procedure of Example I, 100 parts vinyl acetate suspended in 100 parts water containing one part benzoyl peroxide as catalyst and 0.2 part polyvinyl alcohol as suspending agent, were polymerized under reflux conditions until polymeriation was calculated to be 70% complete. There was then added a solution of 5.8 parts of nitrocellulose (¼ second viscosity) in 14.3 parts ethyl acetate, together with a solution of 10 parts of a solid alkyd resin (as for example the solid 100% alkyd resin sold by the Atlas Powder Company, Wilmington, Delaware, under the trade name "Atlac 393," this product having an acid number of 10–15, an A. S. T. M. Soft Point of 80–90° C., and ambler color) in 10 parts of toluene. Reflux was continued for one hour, whereupon solvent was distilled off and the beads of polyvinyl acetate, now containing an alkyd resin as well as nitrocellulose, were collected, washed and dried, as previously described.

*Example XIV*

This example illustrates the incorporation of 43% of a phenolic resin into polyvinyl acetate beads.

Following the bead polymerization procedure of Example I, 100 parts vinyl acetate suspended in 100 parts water containing one part benzoyl peroxide as catalyst and 0.2 part polyvinyl alcohol as suspending agent were polymerized, under reflux conditions, until polymerization was estimated to be 70% complete. There was then added a solution of 30 parts of an oil soluble pure phenolic resin (as sold by Reichhold Chemicals, Inc., Detroit, Michigan, under the trade name "Super Beckacite RM–254," this product having a melting range, according to the capillary tube method, of 172–203° F., a specific gravity of 1.20–1.24, and a color X or lighter, based on U. S. Department of Agriculture resin standards) in 30 parts of vinyl acetate monomer. Reflux was continued for one hour, whereupon solvent was distilled off, and the beads of polyvinyl acetate, now containing phenolic resin, were collected, washed and dried, as previously described.

In the above examples, the function of the polyvinyl alcohol and the magnesium carbonate is that of suspending agent. The benzoyl peroxide is a well known polymerization catalyst. These particular chemicals were used merely as a matter of convenience, and other equivalent materials will be apparent to those in the art.

With reference to polymers such as nitrocellulose, ethyl cellulose, cellulose acetate and the polyvinylacetals, which are not made directly by vinyl polymerization processes, and are therefore not ordinarily available in bead form, it should be pointed out that beads of these polymers, combined with resins, can nevertheless be obtained by our process. This may be accomplished by dissolving the polymer in an organic solvent (which is also a solvent for the particular resin to be used). This solution may then be converted into beads or pearls by mixing in water in the presence of a suspending agent. The low molecular weight resin may then be added to the suspension, resulting in incorporation of the resin into the beads, which process may be facilitated by heating. The resin may be added prior to bead formation, since one begins in this case with a polymer, and there is therefore no question of inhibition of polymerization. Where beads are not required, polymers of this type may also be combined in their normal granular or powdered form with resins, as illustrated in Examples IX and X.

The polymer-resin beads of our invention are remarkably convenient to use, because of their dry, free-flowing nature. They are of particular interest in the field of industrial adhesives, coating and molding compounds. One such class of use is, for example, as adhesives in connection with modern automatic high-speed machinery for manufacturing, sealing and labeling a great variety of industrial products, ranging through such diverse fields as the manufacture of milk cartons and bookbinding, to name only two. So-called hot melts have been used for these purposes, these consisting of polymer-resin formulations in the form of large solid masses, or in chunks which tend to agglomerate into larger masses upon storage. These hot melts are, as the name indicates, melted down by heat to the liquid or semi-liquid consistency required for adhesive application. The awkward physical form of the hot melt formulations frequently involves great inconvenience in their industrial use, necessitating chopping chunks out of the larger masses, or preheating entire containers to convert the adhesive to pourable form. On the other hand, the beads of our invention, which may contain not only resins but also plasticizers and other components required for particular formulations, may be used with notable ease and efficiency in high-speed machine operations, since their granular free-flowing form permits the simple measurement and use of such quantities as may be required at any given time.

While the examples herein given illustrate various specific applications of our invention, we are not limited thereto, since it will be apparent that considerable variation is possible in the materials, proportions and methods used, within the scope of our invention and claims.

We claim:

1. The method of producing polymer-resin beads which consists in suspending high molecular weight polymer beads in a suspension medium, in mixing the suspended polymer beads and a resin in the presence of a solvent which is a solvent for the polymer and the resin, said solvent being substantially insoluble in the suspension medium and being in amount sufficient to soften and swell the polymer beads but to maintain the same in bead and suspended form, the high molecular weight polymer having a molecular weight of at least 10,000 and the resin having a molecular weight of less than 10,000, thereby incorporating the resin into the high polymer beads and producing high polymer beads having the resin uniformly dispersed therein, and separating the beads from the suspension and drying the same.

2. The method of producing polymer-resin beads which consists in suspending high molecular weight polymer beads in an aqueous suspension medium, in mixing the suspended polymer beads and a resin in the presence of an organic solvent which is a solvent for both the polymer and the resin, said organic solvent being substantially insoluble in the suspension medium and being in amount sufficient to soften and swell the polymer beads but to maintain the same in bead and suspended form, the high molecular weight polymer having a molecular weight of at least 10,000 and the resin having a molecular weight of less than 10,000, thereby incorporating the resin into the high polymer beads and producing high polymer beads having the resin uniformly dispersed therein, and separating the beads from the suspension and drying the same.

3. The method of producing polymer-resin beads which consists in suspending high molecular weight polymer beads in a suspension medium, in mixing and heating the suspended polymer beads and a resin in the presence of a solvent which is a solvent for both the polymer and the resin, said solvent being substantially insoluble in the suspension medium and being in amount sufficient to soften and swell the polymer beads but to maintain the same in bead and suspended form, the high molecular weight polymer having a molecular weight of at least 10,000 and the resin having a molecular weight of less than 10,000, thereby incorporating the resin into the high polymer beads and producing high polymer beads having the resin uniformly dispersed therein, and separating the beads from the suspension and drying the same.

4. The method of producing polymer-resin beads which consists in suspending high molecular weight polymer beads in an aqueous suspension medium and in mixing and heating at reflux temperatures the suspended polymer beads and a resin in the presence of an organic solvent which is a solvent for both the polymer and the resin while maintaining the polymer beads in bead and suspended form, said solvent being substantially insoluble in the suspension medium, the high molecular weight polymer having a molecular weight of at least 10,000 and the resin having a molecular weight of less than 10,000, thereby incorporating the resin into the high polymer beads and producing high polymer beads having the resin uniformly dispersed therein, and separating the beads from the suspension and drying the same.

5. The method of producing polymer-resin beads which consists in polymerizing a monomer in a suspension medium and obtaining the polymer in bead form, in then mixing the suspended polymer beads with a resin in the presence of a solvent which is a solvent for both the polymer beads and the resin, said solvent being substantially insoluble in the suspension medium and being in amount sufficient to soften and swell the polymer beads but to maintain the same in bead and suspended form, the high molecular weight polymer having a molecular weight of at least 10,000 and the resin having a molecular weight of less than 10,000, thereby incorporating the resin into the polymer beads and producing polymer beads having the resin uniformly dispersed therein, and separating the beads from the suspension and drying the same.

6. The method of producing polymer-resin beads which consists of heating a monomer in an aqueous suspension medium in the presence of a polymerization catalyst and obtaining the polymer in high molecular weight and bead form, in then adding a resin to the suspended high polymer beads and mixing the same in the presence of a solvent which is a solvent for both the high polymer beads and the resin, said solvent being substantially insoluble in the suspension medium and being in amount sufficient to soften and swell the polymer beads but to maintain the same in bead and suspended form, the high molecular weight polymer having a molecular weight of at least 10,000 and the resin having a molecular weight of less than 10,000, thereby incorporating the resin into the high polymer beads and producing high polymer beads having the resin uniformly dispersed therein, and separating the beads from the suspension and drying the same.

7. The method of producing polymer-resin beads which consists of heat treating a monomer in an aqueous suspension medium in the presence of a polymerization catalyst and obtaining the polymer in high molecular weight and bead form, in then adding a resin to the suspended high polymer beads, mixing the same and continuing the heat treatment in the presence of a solvent which is a solvent for both the high polymer and the resin while maintaining the polymer in bead and suspended form, said solvent being substantially insoluble in the suspension medium and being in amount sufficient to soften and swell the polymer beads but to maintain the same in bead and suspended form, the high molecular weight polymer having a molecular weight of at least 10,000 and the resin having a molecular weight of less than 10,000, thereby incorporating the resin into the high polymer beads and producing high polymer beads having the resin uniformly dispersed therein, and separating the beads from the suspension and drying the same.

8. The method of producing polymer-resin polymerization beads which consists in suspending high molecular weight polymerization beads in a suspension medium, in mixing the suspended polymerization beads and a resin in the presence of a solvent which is a solvent for both the beads and the resin, said solvent being substantially insoluble in the suspension medium and being in amount sufficient to soften and swell the polymer beads but to maintain the same in bead and suspended form, the high molecular weight polymer having a molecular weight of at least 10,000 and the resin having a molecular weight of less than 10,000, thereby incorporating the resin into the high polymer beads and producing high polymer beads having the resin uniformly dispersed therein, and separating the beads from the suspension and drying the same.

9. The method of producing polymer-resin polymerization beads which consists in suspending high molecular weight polymerization beads in an aqueous suspension medium, in mixing and heating the suspended polymerization beads and a resin in the presence of a solvent which is a solvent for both the beads and the resin while maintaining the polymerization beads in bead and suspended form, said solvent being substantially insoluble in the suspension medium and being in amount sufficient to soften and swell the polymer beads but to maintain the same in bead and suspended form, the high molecular weight polymer having a molecular weight of at least 10,000 and the resin having a molecular weight of less than 10,000, thereby incorporating the resin into the beads and producing high polymer beads having the resin uniformly dispersed therein, and separating the beads from the suspension and drying the same.

10. The method of producing polymer-resin beads which consists in taking a high molecular weight polymer and forming polymer beads therefrom in a suspension medium, in mixing the suspended polymer beads with a resin in the presence of a solvent which is a solvent for both the polymer and the resin, said solvent being substantially insoluble in the suspension medium and being in amount sufficient to soften and swell the polymer beads but to maintain the same in bead and suspended form, the high molecular weight polymer having a molecular weight of at least 10,000 and the resin having a molecular weight of less than 10,000, thereby incorporating the resin into the high polymer beads and producing high polymer beads having the resin uniformly dispersed therein, and separating the beads from the suspension and drying the same, 11. The method of producing polymer-resin beads which consists in taking a high molecular weight polymer and forming polymer beads therefrom in an aqueous suspension medium, in heating and mixing the suspended polymer beads with a resin in the presence of a solvent which is a solvent for both the polymer and the resin while maintaining the formed beads in bead and suspended form, said solvent being substantially insoluble in the suspension medium and being in amount sufficient to soften and swell the polymer beads but to maintain the same in bead and suspended form, the high molecular weight polymer having a molecular weight of at least 10,000 and the resin having a molecular weight of less than 10,000, thereby incorporating the resin into the high polymer beads and producing high polymer beads having the resin uniformly dispersed therein, and separating the beads from the suspension and drying the same.

12. Polymer-resin beads comprising high molecular weight polymers having resin uniformly dispersed therein and produced by the method of claim 1.

References Cited in the file of this patent

UNITED STATES PATENTS

| Re. 23,164 | Tompkins | Nov. 1, 1949 |
| 2,275,991 | Powers et al. | Mar. 10, 1942 |
| 2,550,503 | Turnbull | Apr. 24, 1951 |
| 2,636,872 | James et al. | Apr. 28, 1953 |

FOREIGN PATENTS

| 657,545 | Great Britain | Sept. 19, 1951 |

OTHER REFERENCES

India Rubber World (New York), vol. 110, No. 3, pages 291–300.